United States Patent
Vau et al.

(10) Patent No.: US 11,314,211 B2
(45) Date of Patent: Apr. 26, 2022

(54) METHOD AND DEVICE FOR OPTIMIZING PERFORMANCE OF A SERVO CONTROL OF A MECHATRONIC SYSTEM BASED ON EFFECTIVE STATIC AND DYNAMIC MARGINS

(71) Applicant: IXBLUE, Saint-Germain-en-Laye (FR)

(72) Inventors: Bernard Vau, Saint-Germain-en-Laye (FR); Lionel Minne, Saint-Germain-en-Laye (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 16/770,202

(22) PCT Filed: Dec. 6, 2018

(86) PCT No.: PCT/FR2018/053141
§ 371 (c)(1),
(2) Date: Jun. 12, 2020

(87) PCT Pub. No.: WO2019/110942
PCT Pub. Date: Jun. 13, 2019

(65) Prior Publication Data
US 2021/0141347 A1    May 13, 2021

(30) Foreign Application Priority Data
Dec. 7, 2017   (FR) ...................................... 1761757

(51) Int. Cl.
   G05B 13/04   (2006.01)
(52) U.S. Cl.
   CPC ......... G05B 13/045 (2013.01); G05B 13/047 (2013.01)

(58) Field of Classification Search
None
See application file for complete search history.

(56) References Cited

U.S. PATENT DOCUMENTS

| | | | | |
|---|---|---|---|---|
| 5,155,422 | A | * | 10/1992 | Sidman ................ G05B 13/042 318/560 |
| 6,259,221 | B1 | * | 7/2001 | Yutkowitz ............. G05B 11/42 318/561 |

(Continued)

OTHER PUBLICATIONS

Garcia et al. 'Robust PID Controller Tuning with Specification on Modulus Margin' Proceeding of the 2004 American Control Conference Boston, Massachusetts Jun. 30-Jul. 2, 2004.*

(Continued)

*Primary Examiner* — Bernard G Lindsay
(74) *Attorney, Agent, or Firm* — Nixon & Vanderhye

(57) ABSTRACT

A method for automated optimisation of a servo control system controlled by a setpoint, the servo control system including a corrector in a feedback loop, the method exhibiting satisfactory reliability and performance in terms of stability through an iterative procedure, the most effective corrector being determined from among correctors by developing a current value of the delay margin and by individually testing the correctors on the servo control system of the real mechatronic system and by injecting an excitation signal into the loop and by assessing two effective indicators based on at least one effective static margin and one effective dynamic margin, the two effective indicators being an effective static indicator and an effective dynamic indicator, the iterative procedure being stopped on a corrector, which is then the optimal corrector, when the two effective indicators become greater than respective thresholds determined for a current delay margin value.

15 Claims, 2 Drawing Sheets

(56) References Cited

U.S. PATENT DOCUMENTS

Figure 1:
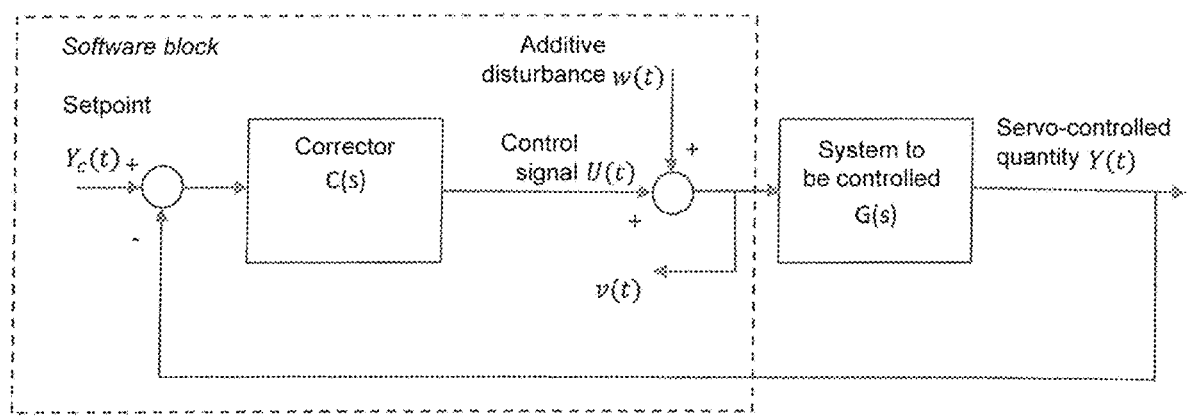

| | | |
|---|---|---|
| 8,386,058 B2 | 2/2013 | Vau |
| 2006/0284588 A1 | 12/2006 | Vau |
| 2009/0281670 A1* | 11/2009 | Vau .......................... G05B 5/01 |
| | | 700/280 |
| 2012/0007541 A1* | 1/2012 | Zhang .................... G11B 19/28 |
| | | 318/621 |
| 2013/0057186 A1* | 3/2013 | Tanabe .................... H02P 23/30 |
| | | 318/400.15 |
| 2019/0361455 A1* | 11/2019 | Fernandez Guzmann .................. |
| | | E02F 9/265 |

OTHER PUBLICATIONS

Yao et al. 'High-Accuracy Tracking Control of Hydraulic Rotary Actuators With Modeling Uncertainties' IEEE/ASME Transactions on Mechatronics, vol. 19, No. 2, Apr. 2014.*
International Search Report—PCT/FR2018/053141—dated Mar. 25, 2019.

* cited by examiner

METHOD AND DEVICE FOR OPTIMIZING PERFORMANCE OF A SERVO CONTROL OF A MECHATRONIC SYSTEM BASED ON EFFECTIVE STATIC AND DYNAMIC MARGINS

TECHNICAL FIELD TO WHICH THE INVENTION RELATES

The present invention generally relates to the field of servo control techniques for mechatronic systems. More particularly, it relates to a method for optimising the performance of a mechatronic system servo control, as well as a suitable device for implementing the method.

TECHNOLOGICAL BACK-GROUND

The mechatronic servo systems are widely used. In such systems, the actuator is generally an electric motor, for example of the rotary or linear type, in particular direct current motor, alternative current brushless motor (AC brushless motor), direct current brushless motor (DC brushless motor), etc. The motor control is a signal proportional to the torque or the force that must be delivered by the motor. The sensor(s) in relation with the motor measure either an angular or linear position (for example, a sensor of the incremental encoder type), or an angular or linear speed (for example, a sensor of the tachometer or gyrometer type).

These mechatronic servo systems are used in particular in the mechanical movement simulators, the multi-axis turrets of the Pan&Tilt type (supporting for example an on-board camera) and used for pointing a target and for stabilizing a line of sight.

One of the difficulties of implementation of such servo controls lies in the tuning of the correctors implemented therein. They may conventionally be PID correctors, or may be a little more complex, in particular in the cases in which it is necessary to have two integrators in the control law, which often occurs in a context of line-of-sight gyroscopic stabilisation.

Among the most elaborate linear correctors, it may be mentioned the correctors of the RST type (with robust pole placement), LQG-LTR type associated with a parameter tuning methodology, for example the Standard State Control of Philippe de Larminat, or the predictive control, or also the Hinfini control.

It will also be noted that, even for a mechatronic system in which a simple PID corrector may be sufficient, the use of an RST corrector has the advantage to allow controlling the high-frequency corrector gain decrease ("roll-off"), which is an advantage from the point of view of robustness to non-structured uncertainties and sensitivity to noise.

It is reminded that the robustness relates to the insensitivity of the corrector to the uncertainties of the physical modelling of the machine to be controlled. These uncertainties may be of two types. A distinction is made between the structured uncertainties, which relate to the parametric variations of the model, for example variations of the value of an inertia or a mass, and the non-structured uncertainties, which correspond to neglected dynamics, for example delays or high-frequency resonant modes.

Considering these corrector tuning difficulties, corrector auto-tuning techniques have been proposed. Many of them can be found in the literature.

It may be mentioned by way of example, in the field of mechanical movement simulators, the patent application WO2006/131664, "Device for automatically adjusting servo controls of a movement mechanical simulator and an associated device", in the name of M. Bernard Vau, to which reference may be made if desired. This document proposes a technique for tuning servo controls of movement simulators, with an RST or LQG-LTR corrector, still having at least two scalar tuning parameters, herein To and Tc, in order to adjust the corrector as a function of the target delay margin (MRC) and the target modulus margin (MMC) of the corresponding closed loop. The parameter To allows managing a compromise between the choice of a high disturbance rejection dynamics and a great delay margin and the parameter Tc allows arbitrating a compromise between the modulus margin and the noise sensitivity of the control.

Still in this document, the MMC indicator (target modulus margin, that is to say obtained in simulation during the corrector synthesis) gives overall information about the robustness of the closed loop with respect to the uncertainties that may affect the system model. The desired value of this target modulus margin generally varies a little and is of the order of 0.5.

The other MRC indicator (target delay margin, that is to say obtained in simulation during the corrector synthesis) is indirectly an indicator of performance of the closed loop in terms of disturbance rejection because at iso-target modulus margin, the reduction of the target delay margin associated with the model of the simple continuous-time system, that is to say the double integrator mentioned hereinabove, involves an increase of the disturbance rejection dynamics.

It is reminded that the performance essentially relates to the disturbance rejection dynamics that may affect the system, notably due to a braking torque caused by friction not taken into account in the model.

Still in this document, the MRC and MMC parameters must be previously defined by a technician, the auto-tuning method being in charge, for a model of the determined/known inertia system, of causing the corrector to have the desired target delay and modulus margins, by calculating low-level coefficients. Even if, from a heuristic point of view, it is much easier to previously define these high-level parameters (MMC and MRC) rather than a multitude of low-level parameters, the fact remains that the technician still have to perform a preparation work in order, in particular, to determine a value of the MRC parameter such that the servo control has a good disturbance rejection dynamics while producing correct robustness and stability levels.

It is reminded that the stability is the ability of the servo-controlled system to act in such a manner that the difference between the setpoint and the mechatronic system output tends towards a finite value when the setpoint is itself finite. However, this convergence can occur after a very long time, which is not desirable. That is why the notion of performance is introduced to characterize a servo control.

More precisely, the above-mentioned patent application WO2006/131664 claimed a tuning method implemented in a movement simulator liable to carry a load, said simulator including a mechanical device and a control unit, said mechanical device including driving means for moving a plate adapted to carry said load; a current amplifier adapted to operate said driving means in response to a control signal; a sensor adapted to measure a position of said plate; and said control unit including a corrector adapted to emit said control signal as a function of a position setpoint signal and of said measured position. This tuning method is characterized in that it allows tuning automatically said corrector in order to servo control, according to the position, the movement of said plate carrying a given load, said method including: an initial step of synthesising a robust corrector, said synthesis being based on a first physical modelling of the mechanical device including at least one inertia parameter, said robust corrected obtained allowing servo controlling said mechanical device over a range of values of said inertia parameter extending between a minimum inertia parameter and a maximum inertia parameter; and, after said given load has been positioned on said plate, a test step during which said mechanical device, servo controlled by means of said robust corrector determined at the initial step, is operated according to a predefined position setpoint profile respecting constraints about the acceleration, speed and position of the movement, said control signal and said measured position being memorized at each time instant as data of the test step; an identification step that, based on said test step data, allows determining the value of a plurality of physical parameters of a second modelling of said mechanical device carrying said given load, said plurality of physical parameters including at least said inertia parameter; and a final step of synthesising an optimum corrector adapted to said given load, in which the inertia parameter takes the value of the inertia parameter determined at the identification step.

In particular embodiments claimed, said robust or optimum correctors comprise four high-level scalar tuning parameters, and said initial step first comprises, by varying a first scalar parameter among said scalar parameters, the search for a corrector having a modulus margin lower than a threshold modulus margin for all the values of moment of inertia of said range of moments of inertia, then, by varying another scalar parameter, called second parameter, among said scalar parameters, the search for a corrector having a delay margin lower than a threshold delay margin for all the values of moment of inertia of said range of moments of inertia. It was also claimed that, the value of the moment of inertia having been identified, said final step first comprises, by varying said second parameter, the search for a corrector having a delay margin higher than said threshold delay margin, then, by also varying another scalar parameter, called third parameter, among said four scalar parameters, the search for an optimum corrector having a modulus margin higher than said threshold modulus margin.

Even is the above-mentioned patent application WO2006/131664 allows reducing the number of parameters to be finally tuned to essentially only one (the MRC parameter), which is very appreciable with respect to the numerous low-level parameters of a corrector (four for a simple PID and generally more for an RST or LQG corrector), this preparation work causes a loss of time and a certain cost in an industrial context.

The proposed invention, besides its extension to any corrector-based servo control of a mechatronic system, aims to eliminate this part of preparation work at the time of implementing the method of the above-mentioned patent application WO2006/131664. This is obtained by the development of a method automating the choice of the MRC coefficient.

OBJECT OF THE INVENTION

In order to remedy the above-mentioned drawback of the state of the art, the present invention proposes a method for automated optimisation of a servo control of a real mechatronic system controlled by a setpoint $Y_c(t)$, said servo control comprising a linear corrector C in a feedback loop including the mechatronic system G, the corrector being defined by corrector parameters, the real mechatronic system G having been modelled by a transfer function, called nominal transfer function $G_0$, between an input control $U(t)$ and an output variable $Y(t)$ measured for servo control purpose, the servo control being characterized by a robustness with respect to the structured and non-structured uncertainties of the mechatronic system and a performance that can be determined, in which method, using the nominal transfer function, corrector parameters are determined, which ensure, at the time of control, a satisfying compromise between performance and robustness, the robustness of the loop applied to the nominal transfer function being dependent on a modulus margin MMC, the performance of the loop applied to the nominal transfer function being dependent on a delay margin MRC.

Moreover, according to the invention, by an iterative procedure, the most performant corrector, called optimum corrector, is determined among the correctors having a satisfying compromise between performance and robustness, said iterative procedure consisting in varying a current value of the delay margin MRC, for a same modulus margin MMC, and testing individually the corrector(s) having a delay margin MRC corresponding to the current value on the servo control of the real mechatronic system and injecting into the loop an excitation signal w(t) and evaluating two effective indicators based on at least an effective static margin $M_{st}$ and an effective dynamic margin $M_{dyn}$, the effective static margin $M_{st}$ characterizing the global robustness of the loop with respect to the structured and non-structured uncertainties, and the effective dynamic margin $M_{dyn}$ characterizing the robustness of the loop with respect to the non-structured uncertainties, the two effective indicators being:

an effective static indicator $Ind_S$ that is the effective static margin $M_{st}$ and an effective dynamic indicator $Ind_D$ that is a direct function of the effective dynamic margin $M_{dyn}$, the iterative procedure being stopped on a corrector, which is then the optimum corrector, when the two effective indicators $Ind_S$ and $Ind_D$ become higher than respective thresholds $S_s$ and $S_D$ determined for a current value of nominal delay margin MRC that is the lowest possible, at a same level of nominal modulus margin MMC, and hence for the highest performance.

Other non-limitative and advantageous characteristics of the method according to the invention, taken individually or according to all the technically possible combinations, are given hereinafter:

the most performant corrector, called optimum corrector, is the corrector that has the best compromise between the performance and the robustness with respect to the uncertainties of the synthesis model, during each evaluation, an effective complementary sensitivity function $T_{yp}(s)$ is estimated and the two effective indicators $Ind_S$ and $Ind_D$ are calculated based on said effective complementary sensitivity function $T_{yp}(s)$, the effective static indicator $Ind_S$ being the effective static margin $M_{st}$ that is equal to the inverse of the norm $H_\infty$ of the effective complementary sensitivity function:

$$M_{st} = \frac{1}{\max_{\omega}|T_{yp}(j\omega)|},$$

and the effective dynamic indicator $Ind_D$ being a ratio between, in the numerator, the effective dynamic margin $M_{dyn}$ and, in the denominator, a parameter chosen among the nominal delay margin MRC and the nominal dynamic margin $M_{dyn0}$, the effective dynamic margin $M_{dyn}$ being equal to the inverse of the maximum of the gain of the product between the effective complementary sensitivity function and the frequency ω:

$$M_{dyn} = \frac{1}{\max_{\omega}|\omega T_{yp}(j\omega)|},$$

the nominal delay margin MRC and the nominal dynamic margin $M_{dyn0}$ being obtained by calculation on the loop applied to the nominal transfer function, the evaluation of the two effective indicators is made during or after the test, the nominal transfer function of the mechatronic system is a simple-integrator or double-integrator function, the control U(t) and the output variable Y(t) are continuous, the control U(t) and the output variable Y(t) are discrete, wherein the servo control implements a time sampling of the data, the output variable Y(t) is a position variable P(t), the output variable Y(t) is a speed variable V(t), the setpoint $Y_c(t)$ is a position variable P(t), the setpoint $Y_c(t)$ is a speed variable V(t), the output variable and the setpoint $Y_c(t)$ are of the same type, either position variables or speed variables, the output variable and the setpoint $Y_c(t)$ are of different types and a calculation is performed to make them of the same type, the control U(t) and the output variable Y(t) are scalars, the control U(t) and the output variable Y(t) are vectors, the excitation signal is a broadband noise, the excitation signal is calculated and is substantially a white noise, the excitation signal is calculated by a pseudo-random binary sequence, PRBS, generator, the effective complementary sensitivity function $T_{yp}(s)$ is estimated by an identification method, said identification method being chosen among the following methods:

method of real-time recursive identification, preferably by a parametric identification method, method of non-parametric identification by spectral identification, in particular using a sliding discrete Fourier transform, the identification method is implemented in real time, i.e. on-line, or in deferred time, i.e. out of line, a calculator is implemented within the loop, said calculator comprising a correction calculation part corresponding to the corrector C, the corrector C receiving as an input or using a signal resulting from the difference computed by the calculator between the setpoint $Y_c(t)$ and the output variable Y(t) measured for servo control purpose, and producing as an output a control signal U(t), said calculator being furthermore configured so that, during the tests, the excitation signal w(t) is added to the control signal before the sending to the mechatronic system G.

The present invention also relates to a servo-control system for a real mechatronic system controlled by a setpoint $Y_c(t)$, said servo control comprising a linear corrector C in a feedback loop including the mechatronic system G, the corrector being defined by corrector parameters, wherein the real mechatronic system G can be modelled by a transfer function, called nominal transfer function $G_0$, between an input control U(t) and an output variable Y(t) measured for servo control purpose, the servo control being characterized by a robustness with respect to the structured and non-structured uncertainties of the mechatronic system and a performance that can be determined.

According to the invention, the system comprises a calculator configured to execute the automated optimisation method of the invention and in which, during tests on the real mechatronic system, the calculator ensures the servo control by processing signals using a tested corrector, the tested corrector C receiving as an input, or using, a signal resulting from the difference computed by the calculator between the setpoint $Y_c(t)$ and the output variable Y(t) measured for servo control purpose, and producing as an output a control signal U(t), said calculator being furthermore configured so that, during the tests, an excitation signal w(t) is added to the control signal before the sending to the mechatronic system G.

Other non-limitative and advantageous characteristics of the system according to the invention, taken individually or according to all the technically possible combinations, are given hereinafter:

the calculator is configured to determine, using the nominal transfer function, correctors and their corrector parameters having a satisfying compromise between performance and robustness, the robustness of the loop applied to the nominal transfer function being dependent on a modulus margin MMC, the performance of the loop applied to the nominal transfer function being dependent on a delay margin MRC, an external calculation device is used and configured to determine, using the nominal transfer function, correctors and their corrector parameters having a satisfying compromise between performance and robustness, the robustness of the loop applied to the nominal transfer function being dependent on a modulus margin MMC, the performance of the loop applied to the nominal transfer function being dependent on a delay margin MRC, the external calculation device is a generic calculation device, in particular a computer or a micro-computer, the calculator is furthermore configured to evaluate two effective indicators based on at least one effective static margin $M_{st}$ and an effective dynamic margin $M_{dyn}$, the effective static margin $M_{st}$ characterizing the global robustness of the loop with respect to the structured and non-structures uncertainties, and the effective dynamic margin $M_{dyn}$ characterizing the robustness of the loop with respect to the non-structured uncertainties, the two effective indicators being:

an effective static indicator $Ind_S$ that is the effective static margin $M_{st}$, and an effective dynamic indicator $Ind_D$ that is a direct function of the effective dynamic margin $M_{dyn}$, an external calculation device is used and configured to evaluate, following each test, two effective indicators based on at least an effective static margin $M_{st}$ and an effective dynamic margin $M_{dyn}$, the effective static margin $M_{st}$, which is equivalent to the complementary modulus margin, characterizing a global level of robustness of the loop with respect to the structured and non-structure uncertainties, and the effective dynamic margin characterizing a level of robustness of the loop with respect to the minor dynamics that the non-structured uncertainties are and corresponding to a generalization of the delay margin, the two effective indicators being:

an effective static indicator $Ind_S$ that is the effective static margin $M_{st}$, and an effective dynamic indicator $Ind_D$ that is a direct function of the effective dynamic margin $M_{dyn}$, the calculator is furthermore configured to execute an iterative procedure of tests and evaluations, said iterative procedure being stopped on a corrector, which is then the optimum corrector, when the two effective indicators $Ind_S$ and $Ind_D$ become higher than respective threshold determined for a current value of delay margin that is the lowest possible and hence for the greatest performance, an external calculation device is used and configured to execute an iterative procedure of tests and evaluations, said iterative procedure being stopped on a corrector, which is then the optimum corrector, when the two effective indicators $Ind_S$ and $Ind_D$ become higher than respective threshold determined for a current value of delay margin that is the lowest possible and hence for the greatest performance.

The method according to the invention is of particularly simple use. It has the advantage that it can be activated by a maintenance or set-up technician, the latter having hence no longer to be an automation technician specialist in the servo control loop tuning. The final user does even no longer need to specify the delay margins, MRC, to be reached, as in the known method, to automatically obtain the synthesis of the optimum corrector that has a satisfying compromise between performance and robustness, preferably the best compromise.

DETAILED DESCRIPTION OF THE INVENTION

The following description in relation with the appended drawings, given by way of non-limitative examples, will allow a good understanding of what the invention consists of and of how it can be implemented.

Figure 2:
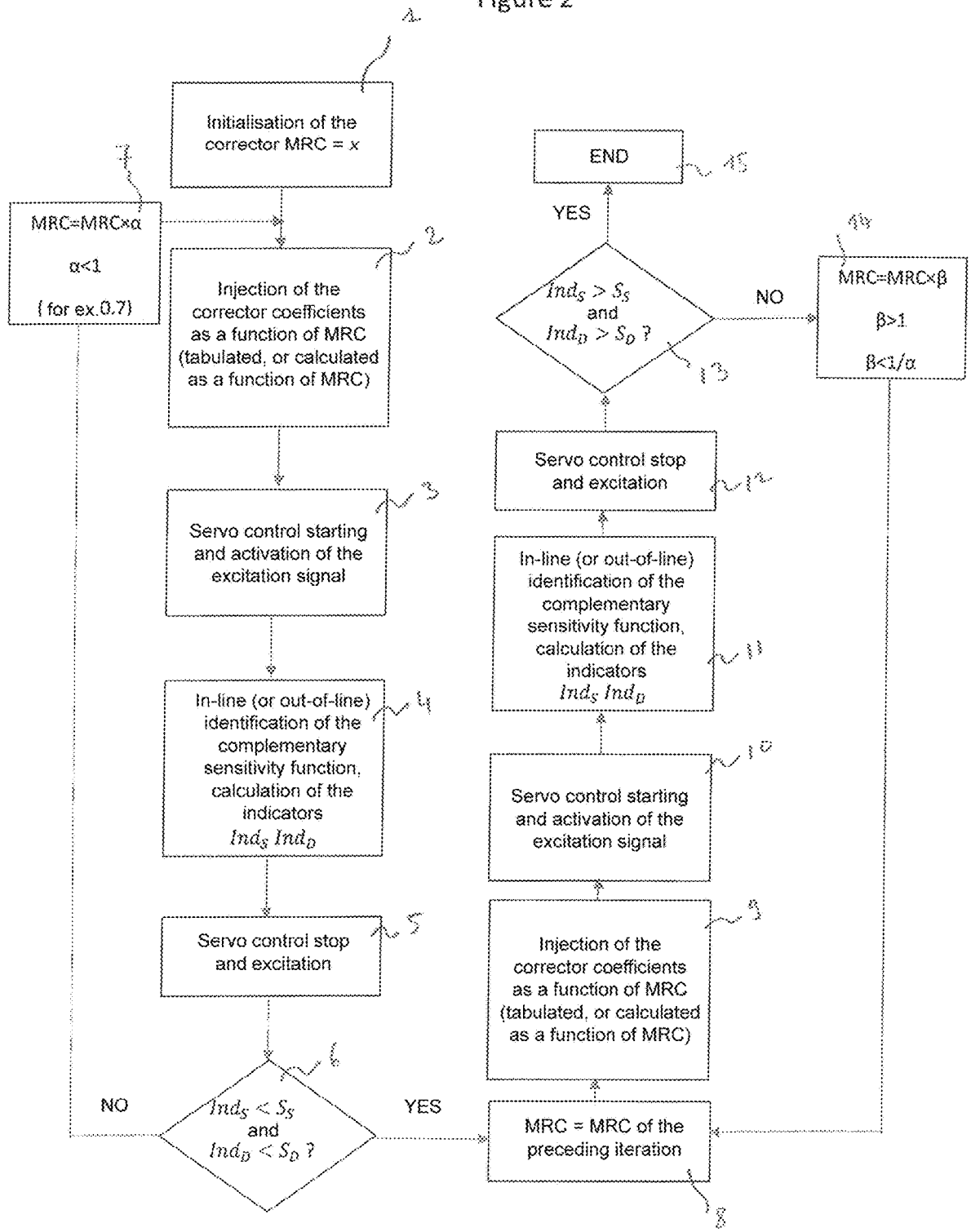

In the appended drawings:

FIG. 1 schematically shows a mechatronic system in a feedback loop for servo control purpose and including a corrector and receiving a setpoint signal, and FIG. 2 shows an example of determination of an optimum corrector as a flow diagram.

The implementation of the invention will now be described in detail, starting with context reminders and information useful for understanding said invention.

The invention hence applies to electromechanical, and more generally mechatronic, systems, controlled in force or torque, which are herein assumed to be monovariable, i.e. having only one input and one output, and whose measured quantities may be:

a position noted P(t), which may be angular or linear, or a speed noted V(t).

The control of the motor, in fact of the amplifier of the power electronic stage associated with the motor, is proportional to a torque or a force. It is noted U(t).

The variable U(t) forms the input of the mechatronic system and the variable P(t) or V(t) corresponds to the servo-controlled quantity Y(t), which is measured at the output and which is desired to be controlled.

The block diagram of FIG. 1 allows visualizing the servo control loop with its corrector C(s) by generalizing the variables to, notably, setpoint variable $Y_c(t)$ and servo-controlled variable Y(t). This diagram brings in a continuous-time transfer function of the corrector, nevertheless it would have been possible to represent it by means of a discrete-time function.

The corrector implemented in the servo-control loop may for example be of the LQG-H2, called LQG, type. The synthesis of such a corrector is performed for example by means of the standard state control methodology. This methodology is described, for example, in Philippe de Larminat's book entitled "Contrôle d'état standard" (in English: "standard state control"), published in 2000, by Editions HERMES. As a variant to the standard state control methodology, the robust pole placement methodology could for example be used. This methodology is described in Philippe de Larminat's book entitled "Automatique: commande des systèmes linéaires" (in English: "Automation: linear system control"), Editions HERMES. The corrector would then have a polynomial form and would be of RST structure, which is the most general form of the correctors controlling systems having a control variable and a measured variable. It is also possible to implement the LQG corrector as an RST form. The corrector may comprise a Kalman filter. The methodology used herein may possibly be used for tuning the PID correctors.

An electromechanical, and more generally mechatronic, system exhibits non-linearities that may be due to dry friction, momentum of inertia, etc. Nevertheless, in the context of synthesis of a monovariable control law, generally only a linear representation/modelling of said system is made, the most common representation/modelling of the monovariable systems being the transfer functions, in particular the continuous-time transfer functions, that are expressed by means of the Laplace variable s.

Hereinafter, the term "nominal", for example nominal margins, will be used to describe elements obtained in simulation with modelling by a nominal model of the mechatronic system to be controlled, also called "synthesis model", whose structure is simplified and corresponds in practice to a double-integrator transfer function (for a position servo control purpose). The coefficients of the transfer function of this synthesis/nominal model are typically obtained at the end of a parametric identification phase, having in particular allowed determining the value of the inertia of the mechatronic system to be controlled or at the very least providing information about this inertia.

It will be seen that the term "nominal" is opposed to the term "effective", which is used to describe elements obtained using the real mechatronic system.

The limitation to a linear representation/modelling is justified by the simplicity it offers, even if at the cost of an approximation with respect to the real physical system.

Hence, the transfer function of the synthesis model of the representation/modelling of a mechatronic system whose measured and controlled variable is the speed may be written:

$$V(t) = \frac{K_{am}}{Js + f} U(t) \quad [\text{M1}]$$

where J is the inertia or the mass of the system, f a viscous friction coefficient, and $K_{am}$ a gain modelling the constant of the torque or force of the motor, as well as the gain of the amplifier and of the power electronic stage associated with the motor.

Assuming that the measured and controlled variable is the position, due to the addition of an integrator, the corresponding transfer function of the synthesis model is written:

$$P(t) = \frac{1}{s} \frac{K_{am}}{Js + f} U(t) \quad [M2]$$

In practice, in many cases, during the synthesis of correctors, still simpler models are used, in which the viscous friction coefficient f is neglected. Under this latter assumption, the transfer functions of the synthesis/nominal models, are simply written:

$$V(t) = \frac{K_{am}}{Js} U(t) = \frac{b}{s} U(t) \quad [M3]$$

and:

$$P(t) = \frac{K_{am}}{Js^2} U(t) = \frac{b}{s^2} U(t) \quad [M4]$$

with: $b = \frac{K_{am}}{J}$.

Such synthesis/nominal models, yet minimalist, are no less sufficient to synthesize simple correctors.

Hereinafter, it is supposed that, for a given servo-controlled system, the coefficient b is known with a good accuracy. The value thereof being most often obtained by means of an identification procedure.

If the synthesis of the corrector is produced in continuous time, based on transfer functions of the simple and double-integrator syntheses/nominal models [M3] and [M4], it is possible, in simulation, to obtain as high performance as desired, i.e. with the MRC as low as desired, for a fixed value of the modulus margin, MMC, for example equal to 0.5. As a reminder, the modulus margin is the distance from the open loop position corrected with respect to the point −1 in the Nyquist plane.

If, in practice, the performance of the corrector is necessarily limited, this is simply due to the fact that, on the one hand, the corrector finally obtained and implanted is of the discrete-time type (time sampling) and that there are generally minor delays in the loop, in particular due to the time of transfer of the information, and on the other hand, that the real system deviates from the model by the presence of high-frequency resonances. The value of the delay margin of a corrector on one of the nominal models [M3] and [M4] may be, for a fixed level of modulus margin, considered as an indicator of performance of the corrector from the point of view of the disturbance rejection.

Hence, it is perfectly possible for each of the transfer functions of the two nominal models [M3] and [M4] to synthetize a set of correctors for many levels of performance, i.e., in practice, for many MRC values, and to previously calculate and tabulate the low-level coefficients obtained for the correctors as a function of the MRC values. This allows, for a given transfer function of a nominal model [M3] or [M4], having a continuum of precalculated coefficients of correctors, indexed to the levels of performance, in practice MRC values. In some cases, it is not even necessary to make use of tabulations obtained by previous calculations (out of line), wherein said low-level coefficients can sometimes be obtained directly by real-time calculation for one/several given levels of performance.

However, except making experiments on the real servo-controlled system for each corrector synthesized to a given MRC value, it won't be known which one of the correctors actually exhibits the best compromise between performance and robustness.

Means allowing an automated optimisation that do not require to be performed by an automation technician specialist will now be described.

In the following, use is made of the concept of direct sensibility function and complementary sensitivity function, which is briefly reminded hereinafter. Let's note C(s) the transfer function of the continuous-time corrector, and G(s) the transfer function of the system to be controlled, the direct sensitivity function $S_{yp}(s)$ is, by definition:

$$S_{yp}(s) = \frac{1}{1 + C(s)G(s)} \quad [F5]$$

It is easily shown that its norm $H_\infty$, i.e. the maximum of its modulus over the whole frequencies, is equal to the inverse of the modulus margin.

The complementary sensitivity function, herein noted $T_{yp}(S)$, called that way due to the relation $T_{yp}(s)=1-S_{yp}(S)$ is written:

$$T_{yp}(s) = \frac{C(s)G(s)}{1 + C(s)G(s)} \quad [F6]$$

With reference to FIG. 1, the direct sensitivity function corresponds to the transfer function between the excitation signal w(t) that is an additive disturbance introduced at the output of the corrector C(s) and the signal v(t) that is the signal produced by the summer (v(t)=U(t)+w(t)). The complementary sensitivity function is for its part the transfer function between the signals w(t) and U(t), the latter signal U(t) being the control resulting from the corrector.

It may be observed in the loop configuration of FIG. 1 that it is easy to create and modify the additive disturbance because this signal w(t) is located in the software part of the loop. Hence, by creating a disturbance corresponding to w(t), the effective direct and complementary sensitivity function can be estimated indirectly.

In the following, $G_o(s)$ is the transfer function of the nominal system corresponding to the equations [M3] and [M4], whereas G(s) is the real transfer function of the real system to be controlled, $G_o(s)$ being only an approximation thereof, and G(s), also called effective transfer function of the system, being unknown. This leads to define the nominal direct sensitivity function $S_{yp0}(s)$ and the nominal complementary sensitivity function $T_{yp0}(s)$ corresponding to the servo control of the nominal system by the corrector. These nominal sensitivity functions correspond to, respectively:

$$S_{yp0}(s) = \frac{1}{1 + C(s)G_0(s)} \quad [F7]$$

$$T_{yp0}(s) = \frac{C(s)G_0(s)}{1 + C(s)G_0(s)} \quad [F8]$$

In view of FIG. 1, it can be observed that it is possible to create a software excitation corresponding to w(t) in the calculator performing in real time the servo control of the hardware system. Hence, by recovering the signal w(t) actually injected at this point of the loop on the real system on which the calculator operates with the corrector (hence not on a simulated/synthesis system) as well as the signals v(t) and U(t), it is possible to analyse them to deduce therefrom, for example by an identification procedure, the effective sensitivity functions $S_{yp}(s)$ and $T_{yp}(s)$. That is this property that is advantageously used in the present invention, in order to optimise the servo control.

Indeed, the effective sensitivity functions $S_{yp}(s)$ and $T_{yp}(s)$ corresponding to the real system are different from the nominal sensitivity functions, due to the fact that the effective transfer function of the system G(s) (which corresponds to the real system) is different from the nominal transfer function $G_0(s)$ used for the synthesis of the corrector.

It has been mentioned hereinabove that the direct sensitivity function allows finding indirectly the modulus margin of the servo control. Hence, the analysis of the effective direct sensitivity function (hence with the real system) by injection of an additive signal w(t) allows estimating the effective modulus margin of the servo control, le latter being very probably lower than the nominal modulus margin established with a simplified model of the system in simulation based on $S_{yp0}(s)$.

If only a linear domain is considered, the uncertainties affecting the transfer function of the of the synthesis model may be classified into two categories:

The structured uncertainties, dues for example to the parametric variations of the basic model (for example, herein, variations of inertia). It is supposed hereinafter that such uncertainties are negligible due to a previous identification having allowed determining the parameters of the nominal model.

The non-structured uncertainties, which correspond to minor dynamics existing on the system, and which are not taken into account in the transfer function of the synthesis model $G_0(s)$. As mentioned hereinabove, they are divided into two categories:

Those which induce a phase-shift or a delay (for example, dynamics of the actuator or the sensor, delay in the transmission of information . . . )

Those which derive from the occurrence of high-frequency resonant modes, generally due to the non-infinite stiffness of the elements constituting the mechanical system to be controlled.

If considering that the structured uncertainties are negligible due to the previous identification having allowed them to be at least partially taken into account in the identified parameters of the nominal model of the system, then the performance limit of the servo control comes from these non-structured uncertainties.

The modulus margin is a global indicator of the robustness of a looped system, and it has been seen hereinabove that this margin can be determined based on the modulus of the direct sensitivity function $S_{yp}(s)$ (the norm $H_\infty$ of the direct sensitivity function $S_{yp}(s)$ is equal to the inverse of the modulus margin).

There also exist other indicators of robustness, which are established based on the complementary sensitivity function:

The complementary modulus margin, or static margin, $M_{st}$, which is the inverse of the norm $H_\infty$ of the complementary sensitivity function:

$$M_{st} = \frac{1}{\max_{\omega}|T_{yp}(j\omega)|}$$

The dynamic margin $M_{dyn}$ (defined by Ph. De Larminat in "Automatique appliquée" (in English: "Applied automation"), Editions HERMES, 2009), intended to guarantee the stability of the loop in case of relative uncertainties on the transfer function of the open loop. This margin that generalizes the delay margin and whose unit is the second, is written:

$$M_{dyn} = \frac{1}{\max_{\omega}|\omega T_{yp}(j\omega)|}$$

In order to introduce the servo control tuning procedure, it is necessary to make the distinction between:

the target/nominal delay margin and the target/nominal modulus margin, obtained in simulation based on the synthesis model $G_0(s)$, and the nominal static margin $M_{st0}$ nominal complementary modulus margin) and nominal dynamic margin $M_{dyn0}$, also obtained in simulation based on the nominal model $G_0(s)$, and the effective static margin $M_{st}$ and the effective dynamic margin $M_{dyn}$, which can be obtained experimentally by an estimation of the effective complementary sensitivity function $T_{yp}(s)$ obtained for example by means of a procedure of identification on the real, looped, servo controlled system with its corrector.

For a low level of performance of the servo control, which is equivalent to having a high MRC, the effective static and dynamic margins are very close to the nominal static and dynamic margins. On the contrary, the higher the nominal performance of the servo control, i.e. the lower the MRC, the more the minor dynamics due to the non-structured uncertainties will become critical for the stability of the loop, which means that the effective static and dynamic margins decrease, and a maximum level of nominal performance finally exists, for which the loop is no longer stable.

In such conditions, it will be considered that the best servo control for a given system with a determined/known inertia is that which has the highest possible nominal performance, while guaranteeing sufficient effective static and dynamic margins. In other words, the matter is to find, for a given corrector structure, the best compromise between performance and robustness with respect to the uncertainties of the model.

Until now, the search for a satisfying corrector required a preparation work and, in particular within the framework of implementation of the invention of the above-mentioned patent application WO2006/131664, in order to tune the corrector, in particular as regards the target delay margin MRC, but without thereby being able to optimise this corrector in a simple and exploitable manner.

The present invention more particularly aims to automate the MRC coefficient search phase making it possible to obtain in a simple manner the corrector having the best compromise between performance and robustness with respect to the uncertainties of the nominal model.

This automated search phase relies on the evaluation of two indicators derived from the effective static and dynamic margins. These two indicators are:

the effective static indicator noted $Ind_S$ that is the effective complementary modulus margin of effective static margin, $M_{st}$, which is the inverse of the norm $H_\infty$ of the effective complementary sensitivity function, and the effective dynamic indicator noted $Ind_d$.

In a first embodiment, the effective dynamic indicator $Ind_d$ is the ratio of the effective dynamic margin $M_{dyn}$ on the nominal delay margin MRC, i.e.:

$$Ind_d = \frac{M_{dyn}}{MRC}.$$

In a second embodiment, the effective dynamic indicator $Ind_d$ is the ratio of the effective dynamic margin $M_{dyn}$ on the nominal dynamic margin $M_{dyn0}$, i.e.:

$$Ind_d = \frac{M_{dyn}}{M_{dyn0}}.$$

The two indicators are hence without unit.

A corrector will be considered as optimum if:

there is a target/nominal delay margin MRC that is the lowest possible, which corresponds to a high performance, while maintaining the two effective indicators of satisfying robustness regarding the stability $Ind_S$ and $Ind_D$ beyond predefined thresholds.

In the following, the threshold of the effective static indicator $Ind_S$ is noted $S_s$, and similarly, the threshold on the effective dynamic indicator $Ind_S$ is noted $S_D$.

If, for a corrector, the nominal delay margin and the nominal dynamic margin are known a priori due to the fact that they result in particular from a simulation, the effective static and dynamic margins, and hence the effective indicators associated, can be obtained only by a characterization of the real closed loop provided with the corrector that is desired to be tested.

The determination of the effective static and dynamic indicators, for a given corrector, is performed by excitation with a disturbance signal w(t) of the closed loop on the real system and provided with the corrector to be tested. If the servo-controlled quantity is the position for a position corrector loop, then a position setpoint is used, which is preferably chosen constant. If the servo-controlled quantity is the speed for a speed corrector loop, then a speed setpoint is used, which may be chosen constant or, preferably, null.

It is to be noted that, hereinabove, a setpoint of the same type as the servo-controlled quantity and as that processed by the corrector has been associated, i.e., for example, a speed setpoint for a quantity of the speed type and a speed corrector. However, it is understood that it is possible to use different types (speed, position, for the servo-controlled quantity, the corrector and the setpoint within the loop, due to these types, may be deduced from each other by mathematical operations or produced by sensors, in particular by derivation.

The excitation is produced by the injection of a broadband disturbance signal at point w(t) in FIG. 1. This broadband disturbance signal may be obtained for example by a white noise generator, or also, preferably, by the generation of a pseudo-random binary sequence (PRBS) that has for advantage to be very easy to implement in a calculator and that has spectral characteristics close to those of a white noise.

The characterization itself of the real mechatronic system is made by acquiring (in fact, using, because the exciting signal injected in the loop is calculated just like the output signal of the corrector) the exciting signal w(t) and the output signal of the corrector U(t) during a time period of a few seconds. The calculated results, which are hence obtained from data of the real mechatronic system, are hence effective results. The signals w(t) and U(t) are then, either:

In a first embodiment, processed in line (=in real time) by means of a recursive identification algorithm that may be a parametric identification algorithm allowing the estimation of a transfer function between the loop points w(t) and U(t), this transfer function corresponding to the effective complementary sensitivity function. As regards the recursive identification algorithms, it may be referred to the book "Commande des systèmes" (in English: "System control") of Loan Dore Landau, Editions HERMES 2002. Once this effective transfer function $T_{yp}(\omega)$ obtained in the frequency domain (frequency $\omega$), the modulus thereof $|T_{yp}(\omega)|$ and the modulus of the product thereof with the frequency $|\omega T_{yp}(\omega)|$ are calculated, in order to determine the effective static $$M_{st} = \frac{1}{\max_{\omega}|T_{yp}(j\omega)|}$$

and dynamic $$M_{dyn} = \frac{1}{\max_{\omega}|\omega T_{yp}(j\omega)|}$$

margins, and thereafter the effective static and dynamic indicators.

In a second embodiment, the estimation of the complementary sensitivity function modulus is also made in line (=in real time), by a non-parametric method, by spectral identification, using, for example, the so-called "Sliding DFT" (Sliding Discrete Fourier Transform") algorithm, which is applied to the signals w(t) and U(t). The power spectral density of the complementary sensitivity function corresponds to the ratio of the power spectral densities of the above-mentioned signals w(t) and U(t). In a variant, if the spectrum of the exciting signal w(t) is known a priori, it is possible to estimate only the spectrum of U(t). In any event, once the spectrum of the complementary sensitivity function obtained, the modulus thereof, then the effective static and dynamic margins and indicators, are easily deduced.

In a third embodiment, the estimation of the modulus of the complementary sensitivity function is made by post-processing of the acquisitions of the signals w(t) and U(t) by means of a parametric identification algorithm operating out of line. For that purpose, reference may be made to the book: "Identification theory for the user", Lennardt Ljung, Prentice Hall, 1999. Here again, the complementary sensitivity function being obtained, the modulus thereof is extracted therefrom, and the effective static and dynamic margins and indicators are deduced therefrom.

In a fourth embodiment, the estimation of the complementary sensitivity function modulus is made by post-processing of the acquisitions of the signals w(t) and U(t) by means of a non-parametric identification algorithm, by spectral identification, using, for example, the so-called "Sliding DFT" (Sliding Discrete Fourier Transform") algorithm. On this matter, it may also be referred Ljung's book. As above, the complementary sensitivity function modulus is then extracted, and the effective static and dynamic margins and indicators are deduced therefrom.

It is to be noted that, due to the fact that there are at least two modes of calculation of the effective dynamic indicator $Ind_d$, either $$Ind_d = \frac{M_{dyn}}{MRC}, \text{ or } Ind_d = \frac{M_{dyn}}{M_{dyn0}},$$

complementary calculations may be required to obtain the potential nominal parameters used as the nominal dynamic margin $M_{dyn0}$ in the second mode.

It is to be noted that methods have been proposed in the literature to determine the modulus margin and the complementary modulus margin without using an identification procedure and, in particular, by implementing relays in the loop. The article: "Closed-loop estimation of robustness margins by the relay method", R. Longchamp and Y. Piguet (IEEE American control conference proceedings, pp. 3687-2691-1995), may notably be mentioned. Unfortunately, this method is not directly usable within the framework of the present invention, because the dynamic margin cannot be obtained by means of the method disclosed in this document.

Likewise, there exist iterative methods for tuning PID correctors aiming to match at best an effective modulus margin with a desired modulus margin, as well as effective gain and phase margins with respect to desired gain and phase margins. On this matter, the article: "Robust PID tuning with specification on modulus margin", D. Garcia, A. Karimi, R. Longchamp (proceedings of the IEEE American control conference, 2004) may be mentioned. The invention presented herein is distinct therefrom by the fact that it aims to find the most performant corrector while maintaining above a threshold not only the effective complementary modulus margin (static margin), but also the effective dynamic margin. Now, in the context of mechanical systems liable to exhibit little-damped resonant modes, the validation of the effective dynamic margin proves crucial.

Whatever the embodiment leading to obtaining the effective static and dynamic indicators, these two effective indicators are then compared to the two thresholds $S_s$ and $S_D$: if each of the two effective indicators is above its corresponding threshold, i.e. higher than this threshold, then the tested corrector may be considered as an admissible corrector, i.e. it provides the loop with a sufficient robustness with respect to the stability. However, this does not mean even so that this corrector is optimum, because it may exist other more performant correctors whose indicators are also above said thresholds.

The satisfaction of the robustness criteria according to the principle described hereinabove allows contemplating the subsequent search for a corrector that is moreover more performant on the basis of the delay margin (MRC). An iterative procedure may be used in order to determine the corrector that is the most performant and whose indicators are above the thresholds $S_s$ and $S_D$. Such an iterative procedure is described in the following and in relation with the flow diagram of FIG. 2. It will however be noted that this flow diagram is exemplary because several variants of said iterative procedure are possible to obtain the optimum corrector.

At step 1 of FIG. 2, the delay margin variable MRC is initialized to a determined value, for example a few tens of milliseconds. This delay margin that becomes the current delay margin will change over the iterations, as will be seen hereinafter.

At step 2, a corrector having a delay margin MRC equal to the current delay margin is calculated, the latter being equal to x at the first passage in this step. As a variant, in which correctors for various delay margin values have been previously calculated, a pre-calculated corrector that has a delay margin corresponding to the current delay margin is simply recovered. In the latter case, a pre-calculated corrector having a delay margin approaching the current delay margin may be used. Thanks to this calculated or recovered corrector, low-level coefficients of the corrector are obtained, and the latter can be implemented in the calculator to process the signals of the feedback loop of the servo control on the real mechatronic system.

At step 3, the low-level coefficients having been implemented in the calculator of the feedback loop of the servo control on the real mechatronic system, the servo control is started to test the corrector by imposing a setpoint, for example a constant position or speed value, and the calculator is caused to inject the excitation signal, typically a white noise, which is added to the corrector output signal to control the real mechatronic system.

At step 4, the two effective indicators $Ind_S$ and $Ind_D$ are evaluated on the basis of the effective complementary sensitivity function $T_{yp}(s)$. This step may be performed during the test (in line), i.e. during the operation of the servo control, or just after or lately (out of line), of the measurements having been recorded for the latter purpose.

At step 5, the servo control, and hence the test, is stopped.

At step 6, two comparisons of the two effective indicators $Ind_S$ and $Ind_D$ with respect to their respective thresholds $S_s$ and $S_D$ are performed. If the two indicators are both lower than their respective thresholds, then, by the branch NO, the process is looped back to step 2 by varying the delay margin at step 7. In the contrary case, branch YES, the process goes to step 8.

At step 7, the delay margin is reduced by multiplication by a factor $\alpha$ lower than 1 and, for example, equal to 0.7. The current delay margin is hence reduced, which corresponds to a higher performance. In variants, this reduction is performed by decrementing by a factor equal to or higher than 1.

At step 8, the current delay margin corresponding to that of the last passage at step 6 having led to the passage through the branch YES and, in the case where the branch would come from step 14, to that produced at step 14, which will be described hereinafter.

Steps 9, 10, 11 and 12 are respectively similar to steps 2, 3, 4 and 5 seen above.

At step 13, two comparisons of the two effective indicators $Ind_S$ and $Ind_D$ with respect to their respective thresholds $S_s$ and $S_D$ are performed. If the two indicators are both higher than their respective thresholds, then, by the branch YES, the iterations are ended, and the optimum corrector has been obtained. In the contrary case, branch NO, the process goes to step 14, to then loops back to step 8.

Step 14 allows increasing the current delay margin and hence reducing the performance. For that purpose, the current delay margin is multiplied by a factor $\beta$ having a value higher than 1 and lower than $1/\alpha$ in order to produce a new delay margin that will be used at the loopback to steps 8 to 12, then 13.

It is to be noted in relation with FIG. 2 that the delay margin MRC, that is varied over the iterations, changes by steps/hops due to the possible multiplications and divisions of its value. It results therefrom that the most performant corrector obtained, called optimum corrector, is related to these steps/hops. It may be contemplated, in particular, that the delay margin change is made by incrementing and decrementing a step value that may be chosen.

It must also be noted that the most performant corrector obtained, called optimum corrector, depends on the correctors that have initially been determined before the tests (out of line or in line) as a function of the modulus margin and of the delay margin on the feedback loop applied to the nominal transfer function: that is among these correctors that the optimum may be found. This optimum is hence relative. As a function of the exhaustivity or not of the initially determined correctors, the optimum will be more or less close to an absolute optimu.

Hence, the invention allows obtaining the corrector that has the best compromise between performance and robustness, and this is made iteratively by means of successive evaluations on the real mechatronic system of static and dynamic indicators with correctors having different performances resulting from different delay margins MRC and obtained based on the model of the mechatronic system, hence based on the nominal transfer function.

More precisely, the method and system for optimizing the compromise between performance and robustness of the servo controls of a mechatronic system, which may be represented by a nominal model of the integrator or double-integrator type and whose low-level coefficients of the servo control are supposed to be parameterized, by means of calculation tables or formulations, from an indicator of global robustness of the servo control on the nominal model, herein the modulus margin MMC, and also from an indicator of performance of the servo control on the nominal model, herein the delay margin MRC, and the coefficient(s) of the nominal model of which are supposed to be known, implement the following means: for a corrector of given nominal performance, the effective complementary sensitivity function is identified and an effective static indicator and an effective dynamic indicator, representative of the robustness of the servo control with respect to the non-structured uncertainties, are extracted therefrom, and these indicators are compared with predefined thresholds. The identification of the complementary sensitivity function modulus may be made according to several embodiments: in line or out of line identification and parametric or non-parametric identification. The effective static indicator corresponds to the complementary modulus margin, the effective dynamic indicator corresponds either to the ratio of the effective dynamic margin to the nominal delay margin, or to the ratio of the effective dynamic margin to the nominal dynamic margin.

Implementations of the method according to the invention show that it is possible to obtain rapidly the parameters of the corrector and that the results are reproducible.

Although the invention has been described with reference to a particular flow diagram, it is in no way limited to an implementation according to this flow diagram. It comprises all the technical equivalents of the means described as well as their combinations that are within the scope of the invention. For example, the method of the invention may moreover take particular constraints into account, as for example a minimum and/or maximum speed of a component of the mechatronic system, a maximum acceleration, a maximum deviation, in particular in the case of a position servo control, etc. The method according to the invention may for example be applied to the case of mechatronic devices allowing both rotational movements about one or several axes, and translational movements along one or several axes, or the combination of rotational and translational movements. Moreover, the invention may be applied to any type of servo-controlled mechatronic system with a corrector and in particular a movement simulator that is an assembly comprising a mechatronic device and electronic and software units of the mechatronic device. Moreover, it may be applied to systems comprising actuator components other than electric components, and for example pneumatic, hydraulic actuators, and combinations of these various types of actuators, in other terms, the invention is applied to any mechatronic system servo controlled in a corrector-based feedback loop.

The invention claimed is:

1. A method for automated optimization of a servo control of a real mechatronic system controlled by a setpoint $Y_c(t)$ (P(t), V(t)), said servo control including a linear corrector in a feedback loop including the real mechatronic system, the linear corrector being defined by corrector parameters, the method comprising:
   determining a nominal transfer function between an input control U(t) and an output variable Y(t) that is measured for servo control, the real mechatronic system modelled by the nominal transfer function; and
   determining corrector parameters of the linear corrector using the nominal transfer function to achieve a robustness and a performance of the feedback loop, the robustness of the feedback loop applied to the nominal transfer function being dependent on a modulus margin, the performance of the feedback loop applied to the nominal transfer function being dependent on a nominal delay margin,
   wherein, by an iterative procedure, a most performant optimum corrector is determined among a plurality of correctors, said iterative procedure comprising
      varying a current value of the delay margin, for the same modulus margin,
      individually testing the linear corrector having the nominal delay margin corresponding to a current value on the servo control of the real mechatronic system,
      injecting an excitation signal w(t) into the feedback loop, and
      evaluating two effective indicators based on at least an effective static margin $M_{st}$ and an effective dynamic margin $M_{dyn}$, the effective static margin $M_{st}$ and the effective dynamic margin $M_{dyn}$ characterizing the robustness of the feedback loop, the two effective indicators being:
         an effective static indicator $Ind_S$ that is the effective static margin $M_{st}$, and
         an effective dynamic indicator $Ind_D$ that is a function of the effective dynamic margin $M_{dyn}$,
      the iterative procedure being stopped on the most performant optimum corrector when the two effective indicators $Ind_S$ and $Ind_D$ become higher than respective thresholds $S_s$ and $S_D$ determined for a current value of the nominal delay margin that is the lowest possible, for a same level of the nominal modulus margin, and for the highest performance.

2. The method according to claim 1, wherein, during each evaluation, an effective complementary sensitivity function $T_{yp}(s)$ is estimated and the two effective indicators $Ind_S$ and $Ind_D$ are calculated based on said effective complementary sensitivity function $T_{yp}(s)$, the effective static indicator $Ind_S$ being the effective static margin $M_{st}$ that is equal to the inverse of the norm $H_\infty$ of the effective complementary sensitivity function:

$$M_{st} = \frac{1}{\max_\omega |T_{yp}(j\omega)|},$$

and
   the effective dynamic indicator $Ind_D$ being a ratio between, in the numerator, the effective dynamic margin $M_{dyn}$ and, in the denominator, a parameter chosen from the nominal delay margin and the nominal dynamic margin $M_{dyn0}$, the effective dynamic margin $M_{dyn}$ being equal to the inverse of the maximum of the gain of the product of the effective complementary sensitivity function by the frequency ω:

$$M_{dyn} = \frac{1}{\max_\omega |\omega T_{yp}(j\omega)|},$$

the nominal delay margin MRC and the nominal dynamic margin $M_{dyn0}$ being obtained by calculation on the feedback loop applied to the nominal transfer function.

3. The method according to claim 1, wherein the nominal transfer function of the real mechatronic system is a simple-integrator or double-integrator function.

4. The method according to claim 1, wherein the excitation signal is calculated and is a white noise.

5. The method according to preceding claim 1, wherein the effective complementary sensitivity function $T_{yp}(s)$ is estimated by an identification method, said identification method being chosen from one of:
- a method of real-time recursive identification, by a parametric identification method, and
- a method of non-parametric identification by spectral identification, using a sliding discrete Fourier transform.

6. The method according to claim 5, wherein the identification method is implemented in real-time or in deferred time.

7. The method according to claim 1, wherein a calculator is implemented within the feedback loop, said calculator comprising a correction calculation part corresponding to the linear corrector, the linear corrector receiving as an input or using a signal resulting from the difference computed by the calculator between the setpoint $Y_c(t)$ and the output variable $Y(t)$ that is measured for servo control, and producing a control signal $U(t)$ as an output, said calculator being configured so that, during tests, the excitation signal $w(t)$ is added to the control signal before sending to the real mechatronic system.

8. A servo-control system for a real mechatronic system controlled by d setpoint $Y_c(t)$ (P(t), V(t)), said servo control system comprising:
- a linear corrector in a feedback loop including the real mechatronic system, the linear corrector being defined by corrector parameters, the real mechatronic system configured to be modelled by a nominal transfer function, between an input control $U(t)$ and an output variable $Y(t)$ measured for servo control; and
- a calculator configured to execute the method according to claim 1 and in which, during tests on the real mechatronic system, the calculator ensures the servo control by processing signals using a tested corrector receiving as an input, or using, a signal resulting from the difference computed by the calculator between the setpoint $Y_c(t)$ and the output variable $Y(t)$ that is measured for servo control, and producing as an output a control signal $U(t)$, said calculator being furthermore configured so that, during the tests, an excitation signal $w(t)$ is added to the control signal before sending to the mechatronic system.

9. The servo-control system according to claim 8, wherein the calculator is configured to evaluate two effective indicators based on at least an effective static margin $M_{st}$ and an effective dynamic margin $M_{dyn}$, the effective static margin $M_{st}$ and the effective dynamic margin $M_{dyn}$ characterizing the robustness of the feedback loop, the two effective indicators being:
- an effective static indicator $Ind_S$ that is the effective static margin $M_{st}$, and
- an effective dynamic indicator $Ind_D$ that is a function of the effective dynamic margin $M_{dyn}$.

10. The servo-control system according to claim 9, wherein the calculator is further configured to execute an iterative procedure of the tests and evaluations, said iterative procedure being stopped on an optimum corrector when the two effective indicators $Ind_S$ and $Ind_D$ become higher than respective thresholds $S_s$ and $S_D$ determined for a current value of nominal delay margin that is the lowest possible value, and hence for the highest performance.

11. The method according to claim 2, wherein the nominal transfer function of the real mechatronic system is a simple-integrator or double-integrator function.

12. The method according to claim 2, wherein the excitation signal is calculated and is a white noise.

13. The method according to preceding claim 2, wherein the effective complementary sensitivity function T_yp (s) is estimated by an identification method, said identification method being chosen from one of:
- a method of real-time recursive identification, by a parametric identification method, and
- a method of non-parametric identification by spectral identification, using a sliding discrete Fourier transform.

14. The method according to claim 13, wherein the identification method is implemented in real-time or in deferred time.

15. The method according to claim 2, wherein a calculator is implemented within the feedback loop, said calculator comprising a correction calculation part corresponding to the linear corrector, the linear corrector receiving as an input or using a signal resulting from the difference computed by the calculator between the setpoint $Y_c(t)$ and the output variable $Y(t)$ that is measured for servo control, and producing a control signal $U(t)$ as an output, said calculator being configured so that, during tests, the excitation signal $w(t)$ is added to the control signal before sending to the real mechatronic system.

* * * * *